(12) United States Patent
Ren et al.

(10) Patent No.: US 12,155,461 B2
(45) Date of Patent: Nov. 26, 2024

(54) CLOCK OFFSET DETERMINATION METHOD, CLOCK OFFSET PROCESSING METHOD, DEVICE, AND SYSTEM

(71) Applicant: DATANG MOBILE COMMUNICATIONS EQUIPMENT CO., LTD., Beijing (CN)

(72) Inventors: Bin Ren, Beijing (CN); Ren Da, Beijing (CN); Hui Li, Beijing (CN)

(73) Assignee: Datang Mobile Communications Equipment Co., Ltd., Beijing (CN)

(*) Notice: Subject to any disclaimer, the term of this patent is extended or adjusted under 35 U.S.C. 154(b) by 448 days.

(21) Appl. No.: 17/440,966

(22) PCT Filed: Feb. 20, 2020

(86) PCT No.: PCT/CN2020/076076
§ 371 (c)(1),
(2) Date: Sep. 20, 2021

(87) PCT Pub. No.: WO2020/186959
PCT Pub. Date: Sep. 24, 2020

(65) Prior Publication Data
US 2022/0166531 A1 May 26, 2022

(30) Foreign Application Priority Data
Mar. 18, 2019 (CN) .......................... 201910201844.5

(51) Int. Cl.
*H04J 3/06* (2006.01)
*H04L 5/00* (2006.01)
*H04W 56/00* (2009.01)

(52) U.S. Cl.
CPC .......... *H04J 3/0638* (2013.01); *H04L 5/0048* (2013.01); *H04W 56/001* (2013.01); *H04W 56/0035* (2013.01)

(58) Field of Classification Search
CPC ... H04J 3/0638; H04L 5/0048; H04W 56/001; H04W 56/0035; H04W 64/00; G01S 5/02
See application file for complete search history.

(56) References Cited

U.S. PATENT DOCUMENTS 8,907,673 B2 12/2014 He et al.
10,659,119 B2 5/2020 Chen et al.
(Continued)

FOREIGN PATENT DOCUMENTS

CN 102232849 A 11/2011
CN 103200677 A 7/2013
(Continued)

OTHER PUBLICATIONS

3rd Generation Partnership Project Technical Specification Group Radio Access Network. Study on NR Positioning Support, 3GPP TR 38.855 V1.1.0, Mar. 11, 2019.
(Continued)

*Primary Examiner* — Dady Chery
(74) *Attorney, Agent, or Firm* — Meunier Carlin & Curfman LLC

(57) ABSTRACT

The present application discloses a clock offset determination method, a clock offset processing method, a device, and a system, used to enable a base station to monitor reference signals, PRS and C-PRS, of a neighboring base station, so as to achieve time synchronization and frequency synchronization between base stations, and to resolve the issue in which a time offset caused by a frequency offset between the base stations results in the degradation of system positioning performance, thereby improving the positioning performance of the system. The clock offset determination method provided in the present application comprises: measuring a carrier-phase positioning reference signal (C-PRS) used to position a carrier phase and transmitted by a transmitter end of a positioning reference signal, so as to obtain a phase
(Continued)

measurement value; and determining, on the basis of the phase measurement value, a clock offset between a receiver end and the transmitter end of the positioning reference signal.

8 Claims, 7 Drawing Sheets

(56) References Cited

U.S. PATENT DOCUMENTS

| | | | |
|---|---|---|---|
| 10,736,113 | B2 | 8/2020 | Chen et al. |
| 2006/0049982 | A1 | 3/2006 | Wells |
| 2014/0122129 | A1 | 5/2014 | Adams et al. |
| 2016/0302165 | A1 | 10/2016 | Cheng et al. |
| 2018/0317111 | A1* | 11/2018 | Agnihotri ............. G01S 5/0252 |
| 2020/0408871 | A1* | 12/2020 | Da ............................ G01S 1/20 |

FOREIGN PATENT DOCUMENTS

| | | | |
|---|---|---|---|
| CN | 103763773 A | 4/2014 | |
| CN | 103841058 A | 6/2014 | |
| CN | 106304316 A | 1/2017 | |
| CN | 108259401 A | 7/2018 | |
| CN | 108702275 A | 10/2018 | |
| EP | 3169121 A1 | 5/2017 | |
| WO | WO-2018149481 A1 * | 8/2018 | .......... H04W 52/243 |

OTHER PUBLICATIONS

Further discussion of NR RAT-dependent DL Positioning, 3GPP TSG RAN WG1 Meeting #96, R1-1901980, Mar. 1, 2019.
Further discussion of NR RAT-dependent UL Positioning, 3GPP TSG RAN WG1 Meeting #96, R1-1901981, Mar. 1, 2019.
Discussions on DL only based Positioning, 3GPP TSG RAN WG #96, R1-1903346, Mar. 1, 2019.
DL and UL based NR positioning, 3GPP TSG RAN WG1 #96, R1-1901849, Mar. 1, 2019.
NR positioning Reference Signals for OTDOA, 3GPP TSG RAN WG1 #95, R1-1812616, Nov. 2018.
International Search Report issued in PCT/CN2020/076076, dated Apr. 26, 2020, 4 pages.

* cited by examiner

CLOCK OFFSET DETERMINATION METHOD, CLOCK OFFSET PROCESSING METHOD, DEVICE, AND SYSTEM

The present application is a national phase entry under 35 U.S.C. § 371 of International Application No. PCT/CN2020/076076, filed on Feb. 20, 2020, which claims the priority from Chinese Patent Application No. 201910201844.5, filed with the Chinese Patent Office on Mar. 18, 2019 and entitled "clock offset determination and processing methods, devices and system", which is hereby incorporated by reference in its entirety.

FIELD

The present application relates to the field of communication technology, and in particular to clock offset determination and processing methods, devices and system.

BACKGROUND

In a user terminal positioning system of wireless communication, the time and frequency synchronization deviations between base stations is one of the key issues that directly affect the positioning performance.

The 3GPP defines various positioning methods for UE by measuring the Positioning Reference Signal (PRS), such as Observed Time Difference Of Arrival (OTDOA), Uplink observed Time Difference Of Arrival (UTDOA) or the like, of the 3GPP wireless communication system. These methods can achieve positioning based on the PRS of the wireless communication system itself, and can work in the environment where the positioning reference signals outside the network cannot be received. However, the common problem of these positioning methods is low positioning accuracy.

In view of the current problem of low positioning accuracy of the OTDOA and UTDOA, the related art proposes a UE positioning method based on the measurement of the phase of the carrier signal of the 3GPP wireless communication system itself. In this method, the signal sending end (which can be a Base Station (BS) or User Equipment (UE) or vehicle) in the 3GPP wireless communication system not only sends the PRS, but also sends the Carrier phase Positioning Reference Signal (C-PRS) for carrier phase positioning. The receiving end obtains positioning measurements, including Time Of Arrival (TOA)/Time Difference Of Arrival (TDOA) and carrier phase measurement, by receiving the PRS and C-PRS. This method uses the positioning reference signal and carrier reference signal sent by the 3GPP wireless communication system itself for positioning, and can work in the case that the Global Navigation Satellite System (GNSS) satellite signal is weak or not received and determine the location of the UE with high precision.

The basic method of UE positioning based on the wireless communication carrier phase measurement is as follows.

The sending end (BS or UE) sends the PRS and C-PRS at a pre-configured or pre-defined carrier frequency, where the C-PRS is usually a sinusoidal carrier signal.

For the downlink-based positioning method, such as using OTDOA, the BS is the sending end. Each BS sends the PRS and C-PRS at the pre-configured or pre-defined carrier frequency. Different neighbor cells will send the C-PRSs in different subcarriers.

For the uplink-based positioning method, such as using UTDOA, the UE is the sending end. The UE sends the PRS and C-PRS on the pre-configured or pre-defined carrier frequency. Different UEs will send the C-PRSs in different subcarriers.

The receiving end (BS or UE) measures the PRS and C-PRS according to the PRS and C-PRS configuration information. The positioning measurement obtained by using PRS can include TOA/TDOA (TDOA is also called Reference Signal Time Difference (RSTD)), etc. The carrier phase measurement (CP) is obtained by using C-PRS.

The receiving end (BS or UE) reports the positioning measurements (TOA/TDOA/CP, etc.) to a certain positioning server in the wireless communication system. The positioning server determines the position of the UE with high precision according to the PRS and C-PRS configuration information, such as the position of the sending antenna of each cell and the positioning measurements provided by the receiving end.

There are several basic modes to use the TOA and phase measurements for positioning:

non-differential mode: directly use the TOA and phase measurements to calculate the UE position without using differential technology; and differential mode: firstly differentiate the TOA and phase measurements to eliminate some common deviations in the measurements, and then use the differentiated TOA and phase measurements to calculate the UE position.

There are two differential modes:

single differential mode: select a sending end (or receiving end) as the reference end, and then perform the differential operation on the measurements related to other sending ends (or receiving ends) and the measurements related to the reference end. The purpose of single differential is to eliminate the measurement errors of a certain end (receiving end or sending end). For example, the RSTD measurement of 3GPP OTDOA positioning is obtained by performing the differential operation on the TOA measurement of a UE related to each BS and the TOA measurement of the UE related to a reference BS. The differential purpose is to eliminate the influence of the clock offset of the UE on positioning; and dual differential mode: perform the differential operation on the measurements after the single differential mode to eliminate the measurement errors related to both the sending end and the receiving end, such as the clock offsets of the BS and UE. For example, the dual differential technology can be used in downlink positioning scenarios. In this case, there are multiple sending ends (base stations) and two receiving ends, one of which is a reference receiving end with a known position. The other receiving end is a UE of which the position is unknown. The two receiving ends receive the positioning signal sent by the base station at the same time, and the dual differential technology is used to eliminate the common errors related to the sending end and the receiving end in the measurements of the two receiving ends, and then the position of the receiving end of which the position is unknown is accurately calculated. The dual differential mode can eliminate the influence of the time and frequency synchronization deviations between base stations on the positioning accuracy.

As can be seen, the non-differential mode is affected simultaneously by the clock offsets of the UE and the base station, and the clock offset of the UE is much larger than the clock offset of the base station, so this mode is not adopted by 3GPP. The dual differential mode requires that one reference receiving end is specially placed in a known position, which will have a negative impact on the specific system implementation. The single differential mode is currently used for the RSTD measurement of 3GPP OTDOA positioning (the calculation method of the RSTD measurement is to perform the differential operation on the TOA measurements of the target UE related to all BSs and the TOA measurement of the UE related to a reference BS). The single differential mode can eliminate the influence of the clock offset of the UE on positioning, but the time and frequency synchronization deviations between the base stations will directly affect the positioning accuracy of the single differential mode.

SUMMARY

The embodiments of the present application provide clock offset determination and processing methods, devices and system, so as to monitor the reference signals PRS and C-PRS of a neighboring base station through a base station to achieve the time and frequency synchronization between base stations, solving the problem that the time offset due to the frequency offset between base stations causes the degradation of the system positioning performance, and thus improving the positioning performance of the system.

At a receiving end, a clock offset determination method provided in an embodiment of the present application includes:
  obtaining a phase measurement by measuring a C-PRS for carrier phase positioning sent by a sending end of a positioning reference signal;
  determining a clock offset between a receiving end of the PRS and the sending end of the PRS based on the phase measurement.

Optionally, the clock offset is determined based on multiple phase measurements obtained by measuring C-PRSs sent by the sending end at multiple moments.

Optionally, the clock offset is determined based on the multiple phase measurements and multiple TOA measurements obtained by measuring, at multiple moments, the PRS sent by the sending end.

Optionally, the method further includes:
  notifying a UE of the clock offset, to allow the UE to eliminate an influence of the clock offset in a single-differential positioning calculation process;
  or, notifying the sending end of the PRS and C-PRS of the clock offset, to allow the sending end to correct a clock according to the clock offset.

Optionally, the phase measurement is obtained by measuring the C-PRS being phase-locked.

At a sending end, a clock offset determination method provided in an embodiment of the present application includes:
  determining a C-PRS for carrier phase positioning;
  sending the C-PRS to a receiving end of a PRS, to allow the receiving end of the PRS to obtain a phase measurement by measuring the C-PRS and to determine a clock offset between the receiving end of the PRS and a sending end of the PRS based on the phase measurement.

Optionally, the C-PRS is sent to the receiving end of the PRS at multiple moments, so that the receiving end of the PRS determines the clock offset based on multiple phase measurements obtained by measuring the C-PRSs at multiple moments.

Optionally, the method further includes:
  sending the PRS at multiple moments, so that the receiving end determines the clock offset based on the multiple phase measurements and multiple TOA measurements obtained by measuring the PRS at multiple moments.

Optionally, the method further includes:
  receiving the clock offset sent by the receiving end, and correcting a clock according to the clock offset.

Optionally, the method further includes:
  sending the PRS and the C-PRS to a UE at multiple moments after correcting the clock according to the clock offset.

At the terminal side, a clock offset processing method provided in an embodiment of the present application includes:
  receiving a clock offset between a receiving end of a positioning reference signal and a sending end of the PRS, wherein the clock offset is determined based on a phase measurement, and the phase measurement is obtained by the receiving end through measuring a C-PRS and the PRS sent by the sending end at multiple moments;
  eliminating the influence of the clock offset.

Optionally, the influence of the clock offset is eliminated in a single-differential positioning calculation process.

At a receiving end, a clock offset determination device provided in an embodiment of the present application includes:
  a memory configured to store program instructions;
  a processor configured to invoke the program instructions stored in the memory, and in accordance with the obtained program, perform the process of:
    obtaining a phase measurement by measuring a C-PRS for carrier phase positioning sent by a sending end of a positioning reference signal;
    determining a clock offset between a receiving end of the PRS and the sending end of the PRS based on the phase measurement.

Optionally, the processor determines the clock offset based on multiple phase measurements obtained by measuring at multiple moments C-PRSs sent by the sending end.

Optionally, the processor determines the clock offset based on the multiple phase measurements and multiple TOA measurements obtained by measuring the PRS sent by the sending end at multiple moments.

Optionally, the processor is further configured to:
  notify a UE of the clock offset, to allow the UE to eliminate the influence of the clock offset in a single-differential positioning calculation process;
  or, notify the sending end, which sends the PRS, of the clock offset, to allow the sending end of the PRS to correct a clock according to the clock offset.

Optionally, the processor obtains the phase measurement by measuring the C-PRS being phase-locked.

At a sending end, a clock offset determination device provided in an embodiment of the present application includes:
  a memory configured to store program instructions;
  a processor configured to invoke the program instructions stored in the memory, and in accordance with the obtained program, perform the process of:
    determining a C-PRS for carrier phase positioning;
    sending the C-PRS to a receiving end of a positioning reference signal (PRS), to allow the receiving end of the PRS to obtain a phase measurement by measuring the C-PRS and to determine a clock offset between the receiving end of the PRS and a sending end of the PRS based on the phase measurement.

Optionally, the processor is configured to send C-PRS at multiple moments, so that the receiving end determines the clock offset based on multiple phase measurements obtained by measuring the C-PRS at multiple moments.

Optionally, the processor is further configured to:
send the PRS at multiple moments, to allow the receiving end of the PRS to determine the clock offset based on the multiple phase measurements and multiple TOA measurements obtained by measuring the PRS at multiple moments.

Optionally, the processor is further configured to:
receive the clock offset, and correct a clock according to the clock offset.

Optionally, the processor is further configured to:
send the PRS and the C-PRS to a UE at multiple moments after correcting the clock according to the clock offset.

Optionally, the processor is further configured to:
obtain a phase measurement by measuring a C-PRS for carrier phase positioning sent by the sending end of the positioning reference signal;
determine a clock offset between the receiving end of the PRS and the sending end of the PRS based on the phase measurement.

At the terminal side, a clock offset processing device provided in an embodiment of the present application includes:
a memory configured to store program instructions;
a processor configured to invoke the program instructions stored in the memory, and in accordance with the obtained program, perform the process of:
receiving a clock offset between a receiving end of a positioning reference signal and a sending end of the PRS, wherein the clock offset is determined based on a phase measurement, and the phase measurement is obtained by the receiving end through measuring C-PRS and PRS sent by the sending end at multiple moments;
eliminating the influence of the clock offset.

Optionally, the processor eliminates the influence of the clock offset in a single-differential positioning calculation process.

At a receiving end, another clock offset determination device provided in an embodiment of the present application includes:
a phase measurement determining unit configured to obtain a phase measurement by measuring a C-PRS for carrier phase positioning sent by a sending end of a positioning reference signal;
a clock offset determining unit configured to determine a clock offset between a receiving end of the PRS and the sending end of the PRS based on the phase measurement.

At a sending end, another clock offset determination device provided in an embodiment of the present application includes:
a carrier phase positioning reference signal determining unit configured to determine a C-PRS for carrier phase positioning;
a carrier phase positioning reference signal sending unit configured to send the C-PRS to a receiving end of a positioning reference signal, to allow the receiving end of the PRS to obtain a phase measurement by measuring the C-PRS and to determine a clock offset between the receiving end of the PRS and a sending end of the PRS based on the phase measurement.

At the terminal side, another clock offset processing device provided in an embodiment of the present application includes:
a receiving unit configured to receive a clock offset between a receiving end of a positioning reference signal and a sending end of the PRS, wherein the clock offset is determined based on a phase measurement, and the phase measurement is obtained by the receiving end through measuring C-PRS and PRS sent by the sending end at multiple moments;
an elimination unit configured to eliminate the influence of the clock offset.

A communication system provided by an embodiment of the present application includes one or a combination of the above-mentioned devices.

Another embodiment of the present application provides a computing device, which includes a memory and a processor, wherein the memory is configured to store the program instructions, and the processor is configured to invoke the program instructions stored in the memory and perform any one of the above-mentioned methods in accordance with the obtained program.

Another embodiment of the present application provides a computer storage medium storing the computer executable instructions which are configured to cause the computer to perform any one of the above-mentioned methods.

BRIEF DESCRIPTION OF THE DRAWINGS

In order to illustrate the technical solutions in the embodiments of the present application more clearly, the accompanying figures which need to be used in describing the embodiments will be introduced below briefly. Obviously the accompanying figures described below are only some embodiments of the present application, and other accompanying figures can also be obtained by those ordinary skilled in the art according to these accompanying figures without creative labor.

DETAILED DESCRIPTION

Figure 1:
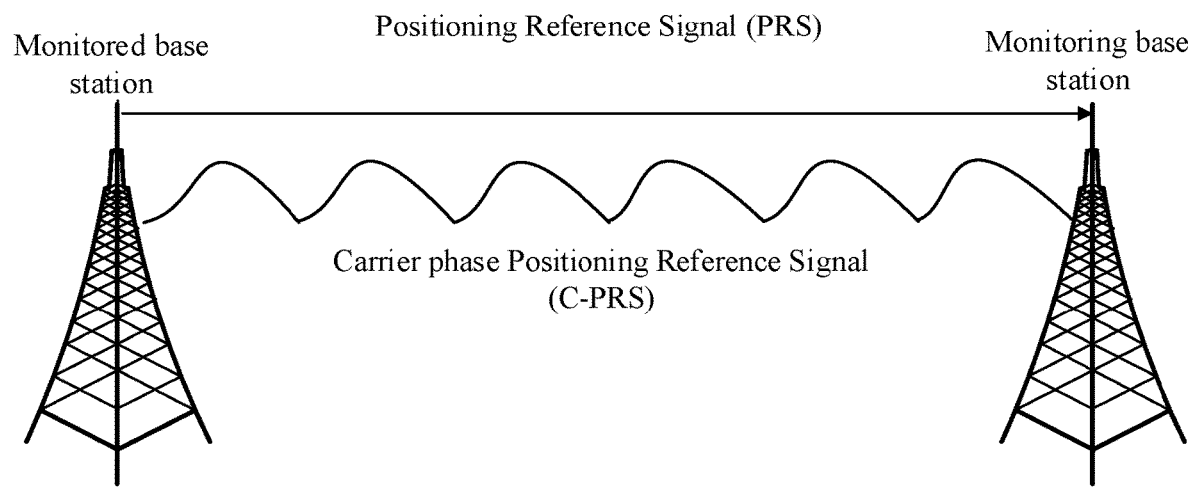
FIG. 1 illustrates the time and frequency synchronization between base stations according to embodiments of the present application.

In order to make the purposes, technical solutions and advantages of the invention clearer, the technical solutions in the embodiments of the invention will be described clearly and completely below in combination with the accompanying drawings in the embodiments of the invention. Obviously the described embodiments are a part of the embodiments of the invention but not all the embodiments. Based upon the embodiments of the invention, all of other embodiments obtained by those ordinary skilled in the art without creative work pertain to the protection scope of the invention.

It should be understood that the technical solutions of the invention can be applied to various communication systems, for example, Global System of Mobile communication (GSM) system, Code Division Multiple Access (CDMA) system, Wideband Code Division Multiple Access (WCDMA) system, General Packet Radio Service (GPRS), Long Term Evolution (LTE) system, Advanced long term evolution (LTE-A) system, Universal Mobile Telecommunication System (UMTS), New Radio (NR) and the like.

The technical solutions in the embodiments of the present application will be described clearly and completely below in combination with the accompanying drawings in the embodiments of the present application. Obviously the described embodiments are only a part of the embodiments of the present application but not all the embodiments. Based upon the embodiments of the present application, all of other embodiments obtained by those ordinary skilled in the art without creative work pertain to the protection scope of the present application.

According to the above discussion, for the single-difference mode, the time synchronization deviation between the base stations is the key to the positioning accuracy of the single-difference mode. At present, the 3GPP is discussing a method of time synchronization between base stations. In this method, a base station monitors the PRS of a neighboring base station. Then, the time offset between the two base stations is estimated based on the arrival time of the detected PRS, the transmission time of the PRS and the known distance between the two base stations. The estimated time offset between the two base stations can be used to eliminate for the influence of the time offset between the base stations on the OTDOA or UTDOA positioning algorithm. The above method of time synchronization between base stations is simple to be implemented, and may reduce the influence of the time offset between two base stations on the positioning accuracy of the single-difference mode to a certain extent. However, the effectiveness of this method is limited as follows:

the PRS is only sent periodically due to the resource usage restriction. The estimation accuracy of the time offset between two base stations estimated based on the PRS sent once is limited;

the time synchronization deviation between two base stations is not fixed but shifts with time, due to the influence of the frequency offset of the base station itself. For example, if the frequency offset of the base station is ±0.05 ppm, the time offset caused by the frequency offset can reach ±5 nanoseconds within 0.1 second.

The embodiments of the present application provide clock offset determination and processing methods and devices, so as to eliminate the influence of the time and frequency synchronization deviations between base stations on the positioning performance, thereby improving the positioning accuracy.

It should be noted that, for the convenience of description, in the embodiments of the present application, PRS represents all reference signals that can be used to measure the Time of Arrival (TOA), for example, including PRS that can be used for traditional OTDOA/UTDOA positioning, Channel State Indication Reference Signal (CSI-RS), Sounding Reference Signal (SRS), etc.

Here, the method and apparatus are based on the same application concept. Since the principle of solving the problem in the method is similar to that in the apparatus, the implementations of the apparatus and method can refer to each other, and the repeated description thereof will be omitted.

The technical solutions provided by the embodiments of the present application may be applicable to various systems, especially 5G systems. For example, the applicable systems may be: Global System of Mobile communication (GSM) system, Code Division Multiple Access (CDMA) system, Wideband Code Division Multiple Access (WCDMA) system, General Packet Radio Service (GPRS) system, Long Term Evolution (LTE) system, LTE Frequency Division Duplex (FDD) system, LTE Time Division Duplex (TDD) system, Universal Mobile Telecommunication System (UMTS), Worldwide interoperability for Microwave Access (WiMAX) system, 5G system and 5G NR system, etc. These systems all include terminal devices and network devices.

The terminal device involved in the embodiments of the present application may be a device for providing the voice and/or data communication to the user, a handheld device with the wireless connection function, or other processing device connected to the wireless modem. In different systems, the terminal device may have different names. For example, in a 5G system, the terminal device may be referred to as User Equipment (UE). The wireless terminal device can communicate with one or more core networks via the RAN, and the wireless terminal device can be a mobile terminal, such as a mobile phone (or called "cellular" telephone), and a computer with the mobile terminal, for example, can be a portable, pocket, handheld, computer built-in or vehicle-carried mobile device, and they exchange the voice and/or data with the radio access network. For example, Personal Communication Service (PCS) telephone, cordless telephone, Session Initiation Protocol (SIP) telephone, Wireless Local Loop (WLL) station, Personal Digital Assistant (PDA) and other devices. The wireless terminal device can also be called system, subscriber unit, subscriber station, mobile station, mobile, remote station, access point, remote terminal, access terminal, user terminal, user agent, user device, which is not limited in the embodiments of the present application.

The network device involved in the embodiments of the present application may be a base station, which may include a plurality of cells. Depending on specific application scenarios, the base station may also be called access point, or may refer to the device in the access network communicating with the wireless terminal via one or more sectors over the air interface or other names. The network device may be used to perform the inter-conversion between the received air frame and Internet Protocol (IP) packet, and used as the router between the wireless terminal device and the rest of the access network, wherein the rest of the access network may include IP networks. The network device can further coordinate the attribute management of the air interface. For example, the network device involved in the embodiments of the present application can be a network device (Base Transceiver Station (BTS)) in the Global System of Mobile communication (GSM) or Code Division Multiple Access (CDMA), or can be a network device (NodeB) in the Wideband Code Division Multiple Access (WCDMA), or can be an evolutional network device (evolutional Node B (eNB or e-NodeB)) in the Long Term Evolution (LTE) system, a 5G base station in the 5G network architecture (next generation system), or can be a Home evolved Node B (HeNB), a relay node, femto, pico, etc., which is not limited in the embodiments of the present application.

The embodiments of the present application will be described below in detail with reference to the drawings of the specification. It should be noted that the showing order of the embodiments of the present application only represents the sequential order of the embodiments, but does not represent the pros and cons of the technical solutions provided by the embodiments.

Referring to FIG. 1, an embodiment of the present application proposes a method for estimating the time and frequency deviations between base stations by using a method of monitoring reference signals mutually between base stations, where a base station monitors the reference signals (PRS and C-PRS) of a neighboring base station to achieve the time and frequency synchronization between base stations.

In the technical solution provided by the embodiment of the present application, the monitoring base station (receiving end) measures the C-PRS signal sent by the monitored base station (sending end), and obtains the phase measurement after the signal is phase-locked; the receiving end obtains the TOA measurement by measuring the PRS signal sent by the sending end; the receiving end determines the clock offset between the receiving end and the sending end jointly based on the above-mentioned phase measurements measured at multiple moments and the TOA measurement. The receiving end notifies the UE of the above clock offset, and the UE removes the influence of the clock offset during the single-differential positioning calculation; or the receiving end sends the clock offset to all monitored base stations respectively, and the monitored base station actively compensate for the clock offset caused by the frequency deviation, and sends the PRS and C-PRS signals to the UE for positioning signal measurement after an influence of the clock offset is eliminated.

Compared with the current method of time synchronization between base stations discussed in 3GPP, the embodiment of the present application adds a C-PRS reference signal for signal phase lock and frequency synchronization. Through the signal phase lock based on the C-PRS signal, on the one hand, the monitoring base station and the monitored base station achieve the complete frequency synchronization, eliminating the influence of the frequency offset of each base station on the time synchronization error between the base stations, and improving the positioning performance of the system. On the other hand, multiple PRS signals and C-PRS signals that are periodically sent can be used to improve the precision of time synchronization error estimation between base stations, thereby improving the positioning performance of the system. The scheme of time and frequency synchronization between base stations in the wireless communication system proposed in the embodiments of the present application can be applied to the OTDOA/UTDOA positioning scheme.

The basic principle of the technical solution provided by the embodiments of the present application is as follows.

Assuming that the TOA measurement obtained by the monitoring base station a (receiving end) through measuring the PRS signal sent by the monitored base station i (sending end) is $T_a^i$, then $T_a^i$ at the moment k can be expressed as follows:

$$T_a^i(k) = r_a^i + c(b_r(k) - b_t(k)) + w_{a,T}^i(k) \tag{1}$$

wherein $T_a^i$ represents the TOA measurement in meters, and $r_a^i$ is the actual physical distance between the sending end and the receiving end and can be derived from the known position of the base station. c is the speed of light, $b_r$ and $b_t$ are the clock offsets (i.e., time synchronization errors) of the receiving end and sending end respectively, and $w_{a,T}^i$ is the TOA measurement error.

The time synchronization error between the receiving end and the sending end at the moment k is:

$$\delta b(k) = b_r(k) - b_t(k) \tag{2}$$

For the purpose of UE positioning, in order to achieve the accurate time synchronization between base stations, $\delta b(k)$ needs to be accurately estimated. If $\delta b(k)$ is estimated only by monitoring the PRS, then the estimated value of $\delta b(k)$ is:

$$\widehat{\delta b}(k) = (T_a^i(k) - r_a^i)/c \tag{3}$$

As such, the time synchronization error depends on the measurement error $w_{a,T}^i(k)$ at the moment k.

Assuming that the monitoring base station a (receiving end) further obtains the phase measurement $P_a^i$ by measuring the C-PRS being phase-locked sent by the monitored base station i (sending end) (the existing technology can be used to achieve the phase locking of the C-PRS signal), then $P_a^i$ at the moments k and k+1 can be expressed as follows:

$$\lambda P_a^i(k) = r_a^i + c(b_r(k) - b_t(k)) + \lambda N_a^i + w_{a,P}^i(k) \tag{4}$$

$$\lambda P_a^i(k+1) = r_a^i + c(b_r(k+1) - b_t(k+1)) + \lambda N_a^i + w_{a,P}^i(k+1) \tag{5}$$

wherein $P_a^i$ is the phase measurement in units of carrier period, $\lambda$ is the carrier wavelength of the C-PRS, $N_a^i$ is the unknown ambiguity of the whole cycle, and $w_{a,P}^i$ is the phase measurement error. The phase measurement error is generally only 10% of the carrier wavelength, which can be ignored when the time synchronization of base stations is discussed. After the equation (4) is subtracted from the equation (5), considering the equation (2), while ignoring phase measurement error, we can get:

$$\lambda[P_a^i(k+1) - P_a^i(k)] = c(\delta b(k+1) - \delta b(k)) \tag{6}$$

The equation (6) shows that the change $(\delta b(k+1) - \delta b(k))$ of the time synchronization error between base stations due to the frequency offset of respective base stations is equivalent to the change of the phase measurement.

If the signal is phase-locked at time $k_0$ and the time synchronization error between base stations is $\delta b(k_0)$ at time $k_0$, then according to formula (6), we can get:

$$c\delta b(k)=c\delta b(k_0)+\lambda[P_a^i(k)-P_a^i(k_0)] \quad (7)$$

The formula (7) is substituted into the formula (1) to get:

$$T_a^i(k)=r_a^i+c\delta b(k)+w_{a,T}^i(k)=r_a^i+c\delta b(k_0)+\lambda[P_a^i(k)-P_a^i(k_0)]+w_{a,T}^i(k),(k=k_0,k_0+1,\ldots) \quad (8)$$

For example, if there are measurements $T_a^i(k)$ and $P_a^i(k)$ ($k=k_0, k_0+1, \ldots k_0+N$), and the distance $r_a^i$ between the base stations is known, the time synchronization error $\delta b(k_0)$ between the base stations can be estimated by the following formula (9):

$$\hat{\delta b}(k_0) = \frac{1}{c(N+1)}\sum_{k=k_0}^{k=k_0+N}[T_a^i(k)-r_a^i-\lambda(P_a^i(k)-P_a^i(k_0))] \quad (9)$$

It can be seen from the formula (9) that the estimation precision of $\delta b(k_0)$ will improve continuously as the number of TOA measurements $T_a^i$ and phase measurements $P_a^i$ increases, and is not affected by the frequency offset of respective base stations themselves. For any moment $k>k_0$, the estimated value of the time synchronization error between the base stations is:

$$\widehat{\delta b}(k)=\widehat{\delta b}(k_0)+\lambda(P_a^i(k)-P_a^i(k_0))/c;(k>k_0) \quad (10)$$

It can be seen from the formula (10) that the estimation precision of $\widehat{\delta b}(k)$ depends on the estimation precision of $\delta b(k_0)$. It will also improve continuously as the number of TOA measurements $T_a^i$ increases, and is not affected by the frequency offset of each base station itself.

After obtaining the time synchronization error $\delta b(k)$ between the monitoring base station (receiving end) a and the monitored i base station (sending end) according to formula (10), there are two solutions as follows.

Solution 1: the monitoring base station measures the clock offset $\widehat{\delta b}(k)$ between the monitoring base station and the monitored base station, and informs the UE of the clock offset. The UE removes the influence of the clock offset during the single-differential positioning calculation. The specific solution refers to Embodiment 1, and the details on how to remove the influence of the clock offset can refer to formula (15) and formula (16) of Embodiment 1 below.

Solution 2: for the scenario in which there are one monitoring base station and multiple monitored base stations, the monitoring base station measures the clock offsets $\widehat{\delta b}(k)$ between the monitoring base station and all the monitored base stations respectively, and sends the clock offsets to all the monitored base stations. The monitoring base station actively compensates for the clock offset introduced by the frequency deviation (the details on how to compensate for can refer to the prior art, see the step 3 of Embodiment 2), and then sends the PRS and C-PRS signals to the UE after correcting the clock according to the clock offset. The specific solution refers to Embodiment 2. Since the clocks of the monitoring base station and multiple non-monitoring base stations keep synchronized, the UE will not be affected by the clock offset introduced by the frequency deviation when measuring the TOA measurements and the carrier phase measurements from different base stations at this time.

Embodiment 1

Figure 2:
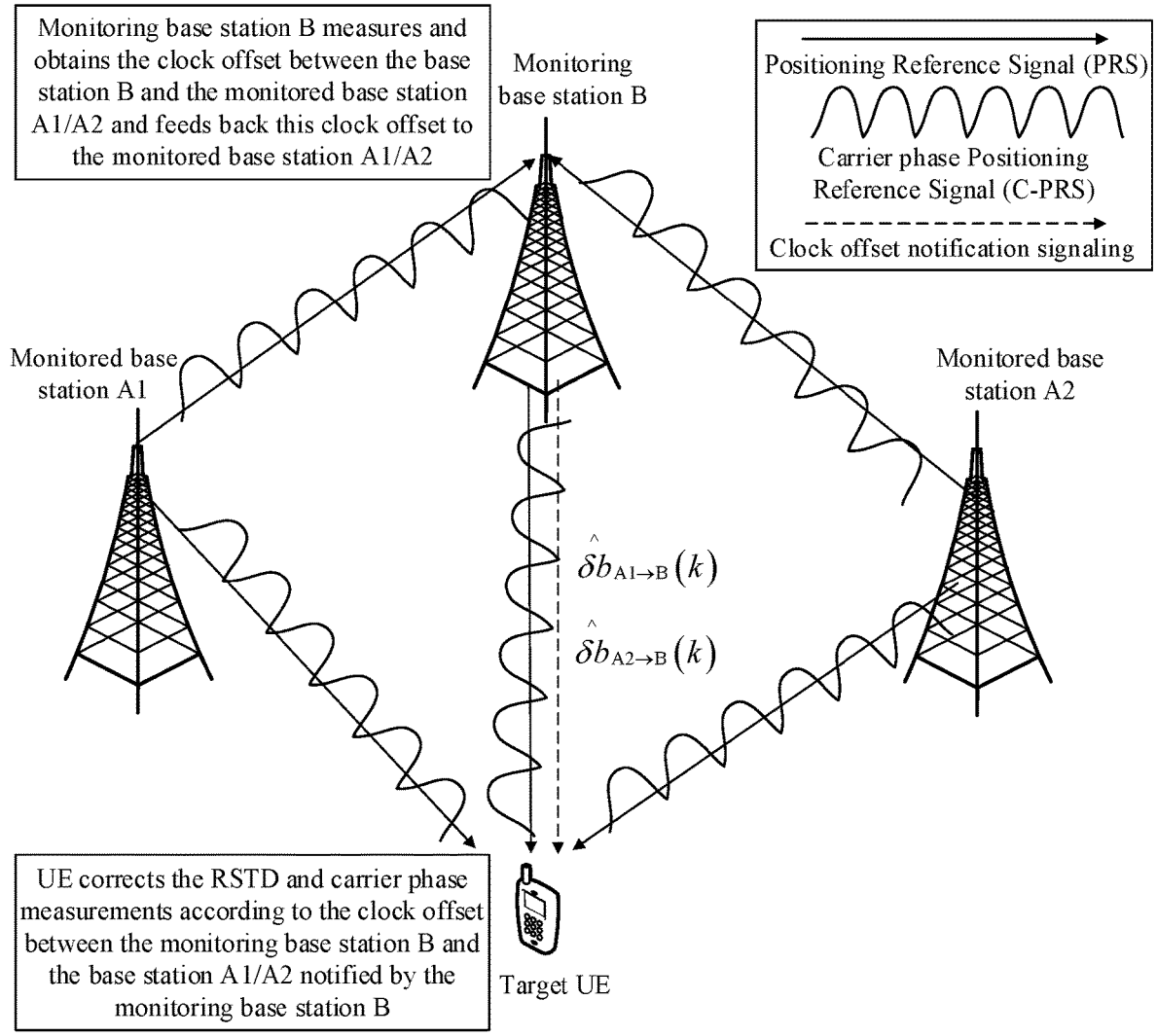
FIG. 2 illustrates a schematic flowchart of a clock offset determination method according to embodiments of the present application.

Referring to FIG. 2, the Embodiment 1 corresponds to the processing solution 1 described above, wherein there is one monitoring base station B and two monitored base stations A1 and A2. The monitoring base station B measures the clock offsets between the monitoring base station B and the monitored base stations A1 and A2, and informs the UE of the clock offsets. The UE removes the influence of the clock offsets when performing the single differential operation on the TOA measurement and the carrier phase measurement.

The specific processing flow is shown in FIG. 2, and the specific steps are as follows.

Step 1: each base station (including monitoring base station B, monitored base stations A1 and A2) sends the PRS and C-PRS signals according to its respective PRS and C-PRS configuration information.

Step 2: the monitoring base station B measures the PRS and C-PRS signals from the monitored base stations A1 and A2 at the same time, obtains the TOA measurements and carrier phase measurements of the base stations A1 and A2, and obtains the clock offset $\widehat{\delta b}_{A1\to B}(k)$ between the base station B and the base station A1 as well as the clock offset $\widehat{\delta b}_{A2\to B}(k)$ between the base station B and the base station A2 according to formula (10), wherein $\widehat{\delta b}_{y\to B}(k)=b_B(k)-b_y(k)$, ($y=A1,A2$); and notifies the UE of these two clock offsets. The base stations B, A1 and A2 do not compensate for the clock offset.

Step 3: the UE measures the PRS and C-PRS signals of the base stations A1, A2 and B respectively, and obtains the first TOA measurements $T_{UE}^x(k)$, ($x=A1,A2,B$) and the first carrier phase measurements $\lambda P_{UE}^x(k)$, ($x=A1,A2,B$):

$$T_{UE}^x(k)=r_{UE}^x+c(b_{UE}(k)-b_x(k))+w_{UE,T}^x(k)(x=A1,A2,B) \quad (11)$$

$$\lambda P_{UE}^x(k)=T_{UE}^x+c(b_{UE}(k)-b_x(k))+\lambda N_{UE}^x+w_{UE,P}^x(k); (x=A1,A2,B) \quad (12)$$

Step 4: the UE performs the single differential operation on the first TOA measurements $T_{UE}^{A1}(k)$ and $T_{UE}^{A2}(k)$ and the first carrier phase measurements $\lambda P_{UE}^{A1}(k)$ and $\lambda P_{UE}^{A2}(k)$ measured by the monitored base stations A1 and A2 as well as the first TOA measurement $T_{UE}^B(k)$ and the first carrier phase measurement $\lambda P_{UE}^B(k)$ measured by the monitoring base station B to obtain the following first single-differential measurements:

$$T_{UE}^{y,B}(k)=T_{UE}^y(k)-T_{UE}^B(k)=r_{UE}^{y,B}+c(b_B(k)-b_y(k))+w_{UE,T}^{y,B}(k),(y=A1,A2) \quad (13)$$

$$\lambda P_{UE}^{y,B}(k)=\lambda P_{UE}^y(k)-\lambda P_{UE}^B(k)=r_{UE}^{y,B}+c(b_B(k)-b_y(k))+\lambda N_{UE}^{y,B}+w_{UE,P}^{y,B}(k),y=A1,A2) \quad (14)$$

wherein the TOA single-differential measurement $T_{UE}^{y,B}(k)$ is also called RSTD.

Step 5: the UE uses the clock offsets $\widehat{\delta b}_{A1\to B}(k)$ and $\widehat{\delta b}_{A2\to B}(k)$ between the base station B and the base stations A1 and A2 notified by the base station B to remove the influence of the clock offsets $\widehat{\delta b}_{y\to B}(k)$ ($y=A1,A2$) from the first single-differential measurements obtained by formulas (13) and (14) in step 3$b$, to obtain the updated second single-difference measurements:

$$\hat{T}_{UE}^{y,B}(k)=T_{UE}^{y,B}(k)-\widehat{\delta b}_{y\to B}(k)\approx r_{UE}^{y,B}(y=A1,A2) \quad (15)$$

$$\lambda \hat{P}_{UE}^{y,B}(k)=\lambda P_{UE}^{y,B}(k)-\widehat{\delta b}_{y\to B}(k)\approx r_{UE}^{y,B}+\lambda N_{UE}^{y,B}(y=A1,A2) \quad (16)$$

Step 6: the UE reports the second single-differential TOA measurement and the second single-differential carrier phase measurements $\hat{T}_{UE}^{y,B}(k)$ and $\lambda \hat{P}_{UE}^{y,B}(k)$ ($y=A1,A2$) calculated in step 5 to the LMF.

Step 7: the LMF uses the second single-differential TOA measurement and the second carrier phase measurements $\hat{T}_{UE}^{y,B}(k)$ and $\lambda \hat{P}_{UE}^{y,B}(k)$ (y=A1, A2) reported by the UE in step 6 as well as the information such as the positions of the base stations A1, A2 and B to calculate the positioning location of the UE.

Embodiment 2

Figure 3:
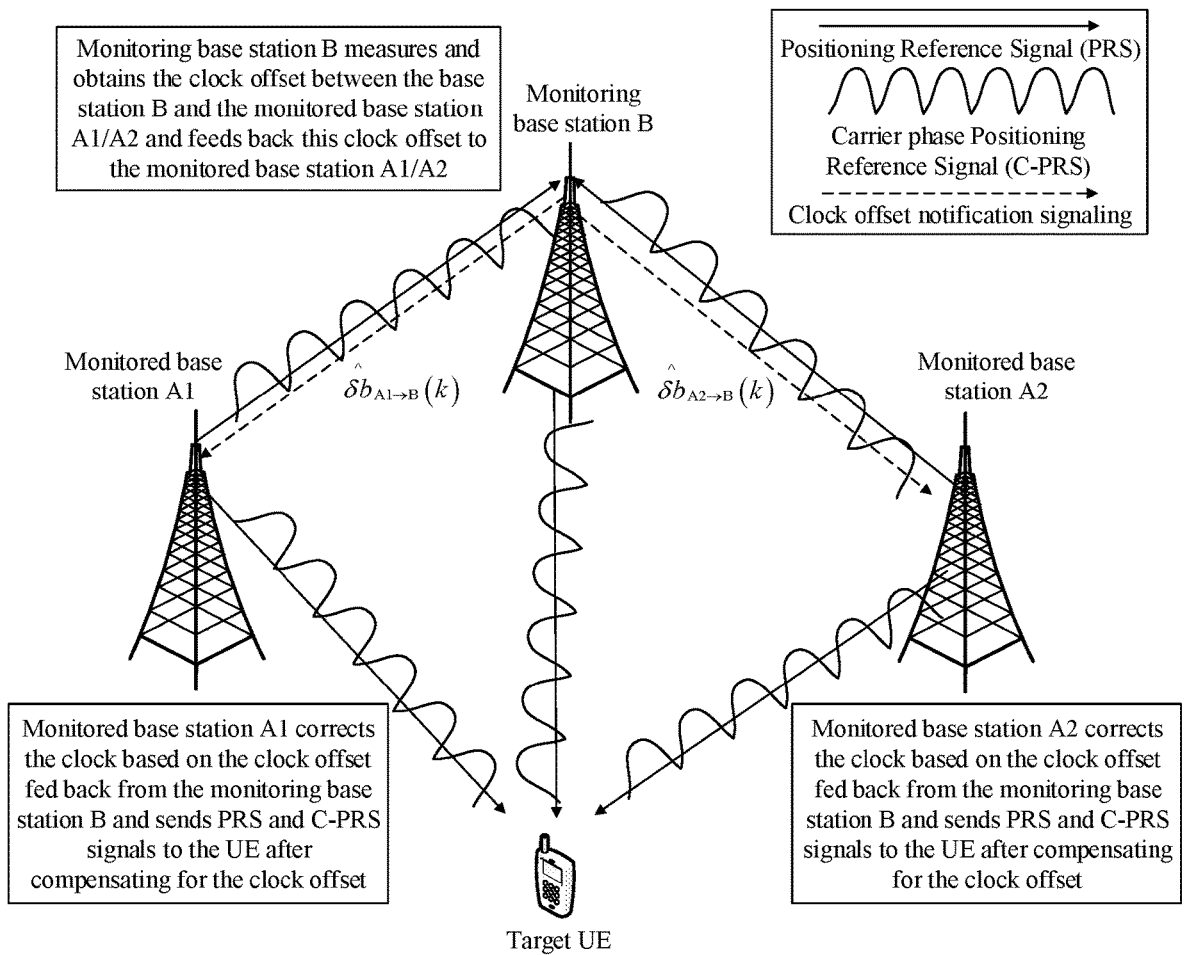
FIG. 3 illustrates a schematic flowchart of another clock offset determination method according to embodiments of the present application.

Referring to FIG. 3, the embodiment 2 corresponds to the processing solution 2 described above, where there is one monitoring base station B and two monitored base stations A1 and A2. The monitoring base station B measures the clock offsets between the monitoring base station B and the monitored base stations A1 and A2, to allow the monitored base stations A1 and A2 to actively compensate for the clock offset introduced by the frequency deviation.

As shown in FIG. 3, the specific steps are as follows.

Step 1: each base station (including monitoring base station B, monitored base stations A1 and A2) sends the PRS and C-PRS signals according to its respective PRS and C-PRS configuration information.

Step 2: the base station B measures the PRS and C-PRS signals of the base stations A1 and A2 at the same time, obtains the TOA measurements and carrier phase measurements of the base stations A1 and A2, and obtains the clock offset $\widehat{\delta b}_{A1 \to B}(k)$ between the base station B and the base station A1 as well as the clock offset $\widehat{\delta b}_{A2 \to B}(k)$ between the base station B and the base station A2 according to formula (10), wherein $\widehat{\delta b}_{y \to B}(k) = b_B(k) - b_y(k)$, (y=A1, A2).

Step 2a: the base station B sends the clock offset $\widehat{\delta b}_{A1 \to B}(k)$ between the base station B and the base station A1 to the base station A1, and sends the clock offset $\widehat{\delta b}_{A2 \to B}(k)$ between the base station B and the base station A2 to the base station A2.

Step 3: the monitored base stations A1 and A2 compensate for the clock offsets $\widehat{\delta b}_{A1 \to B}(k)$ and $\widehat{\delta b}_{A2 \to B}(k)$ from the base station B respectively, and then the base stations A1 and A2 send the PRS signals and C-PRS signals after correcting the clock according to the clock offsets to the UE respectively.

Step 4: the UE measures the PRS and C-PRS signals sent by the base station B as well as the PRS and C-PRS signals sent by the base stations A1 and A2 after correcting the clock according to the clock offsets respectively, and calculates the first RSTD measurement and the first carrier phase measurement.

Step 5: the UE reports the first RSTD measurement and the first carrier phase measurement obtained in step 4 to the LMF.

Step 6: the LMF uses the first RSTD measurement and the first carrier phase measurement reported by the UE in step 5 to calculate the positioning location of the UE.

Figure 4:
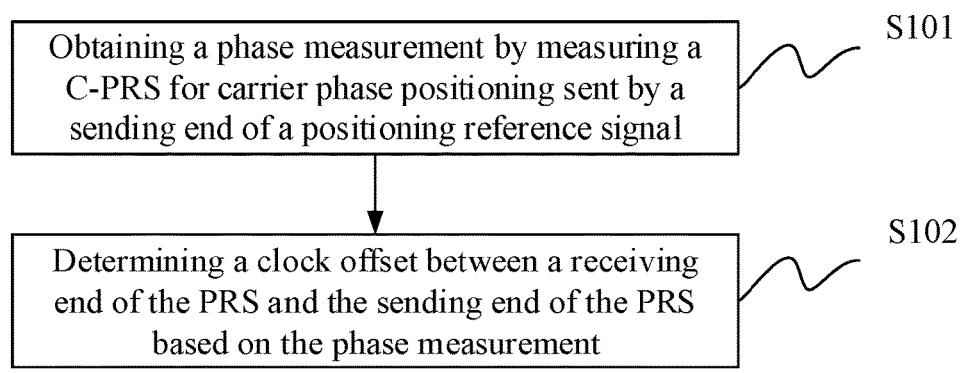
FIG. 4 illustrates a schematic flowchart of a clock offset determination method at the receiving end according to embodiments of the present application.

In summary, referring to FIG. 4, a clock offset determination method provided in an embodiment of the present application at the receiving end includes the following.

S101: obtaining a phase measurement by measuring a C-PRS for carrier phase positioning sent by a sending end of a positioning reference signal (PRS).

S102: determining a clock offset between a receiving end of the PRS and the sending end of the PRS based on the phase measurement.

Optionally, the clock offset is determined based on multiple phase measurements obtained by measuring, at multiple moments, C-PRSs sent by the sending end of the PRS.

Optionally, the clock offset is determined based on the multiple phase measurements and multiple TOA measurements obtained by measuring PRS sent by the sending end at multiple moments.

Optionally, the method further includes:
notifying a UE of the clock offset, to allow the UE to eliminate the influence of the clock offset in a single-differential positioning calculation process;
or, notifying the sending end, which sends the PRS, of the clock offset, to allow the sending end of the PRS to correct a clock according to the clock offset.

Optionally, the phase measurement is obtained by measuring the C-PRS being phase-locked.

Figure 5:
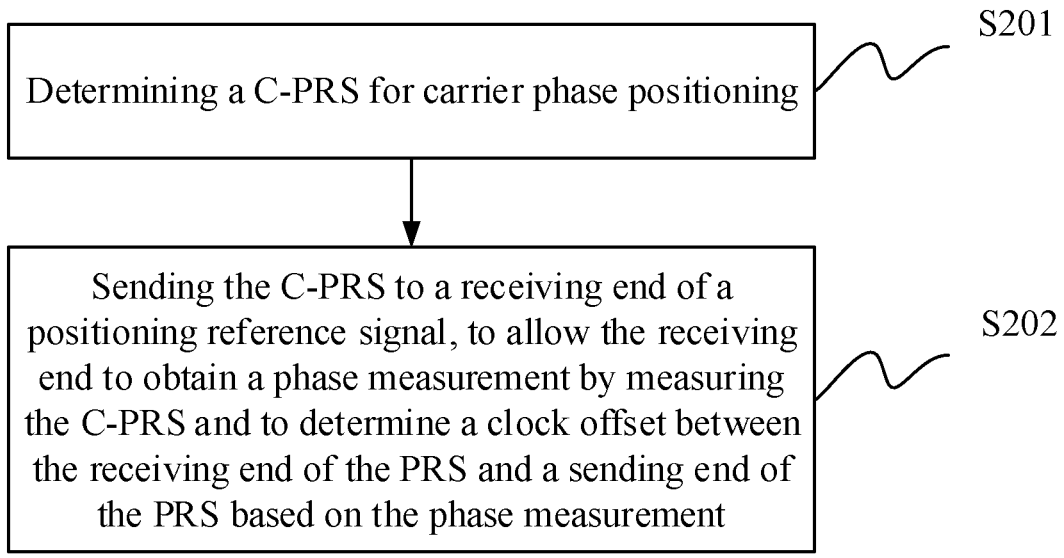
FIG. 5 illustrates a schematic flowchart of a clock offset determination method at the sending end according to embodiments of the present application.

At the sending end, referring to FIG. 5, a clock offset determination method provided in an embodiment of the present application includes.

S201: determining a C-PRS for carrier phase positioning.

S202: sending the C-PRS to a receiving end of a positioning reference signal, to allow the receiving end of the PRS to obtain a phase measurement by measuring the C-PRS and to determine a clock offset between the receiving end of the PRS and a sending end of the PRS based on the phase measurement.

Optionally, the C-PRS is sent to the receiving end of the PRS at multiple moments, so that the receiving end of the PRS determines the clock offset based on multiple phase measurements obtained by measuring the C-PRS at multiple moments.

Optionally, the method further includes:
sending PRSs at multiple moments, to allow the receiving end to determine the clock offset based on the multiple phase measurements and multiple TOA measurements obtained by measuring the PRSs at multiple moments.

Optionally, the method further includes:
receiving the clock offset sent by the receiving end of the PRS, and correcting a clock according to the clock offset.

Optionally, the method further includes:
sending the PRS and C-PRS to a UE at multiple moments after correcting the clock according to the clock offset.

Figure 6:
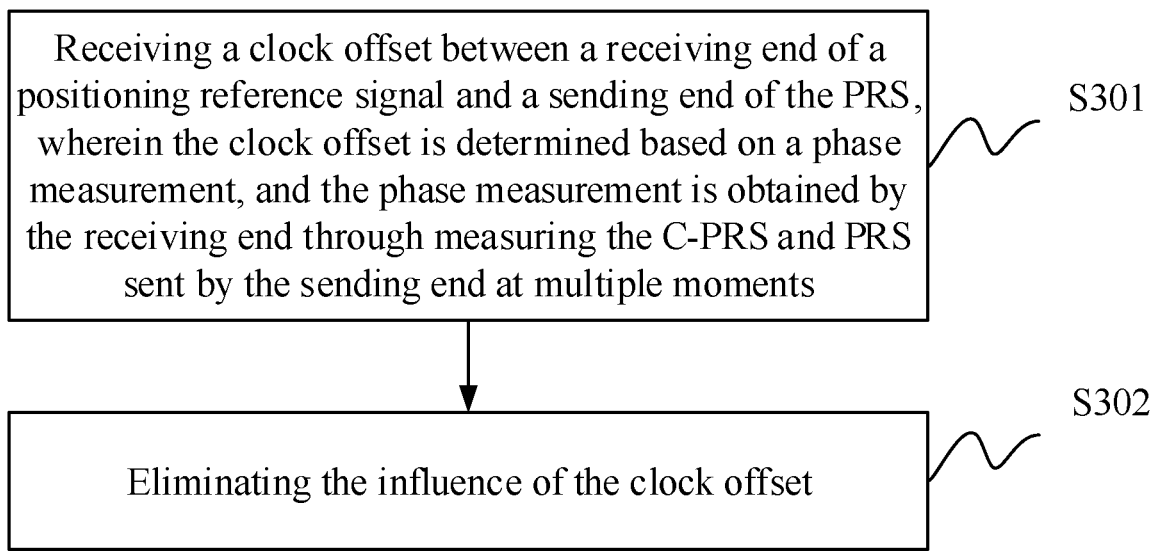
FIG. 6 illustrates a schematic flowchart of a clock offset processing method at the UE end according to embodiments of the present application.

At the terminal side, referring to FIG. 6, a clock offset processing method provided in an embodiment of the present application includes the following.

S301: receiving a clock offset between a receiving end of a PRS and a sending end of the PRS, wherein the clock offset is determined based on a phase measurement, and the phase measurement is obtained by the receiving end of the PRS through measuring the C-PRS and PRS sent by the sending end at multiple moments.

S302: eliminating the influence of the clock offset.

Optionally, the influence of the clock offset is eliminated in a single-differential positioning calculation process.

Corresponding to the foregoing methods, the devices and system provided in the embodiments of the present application will be introduced below.

Figure 7:
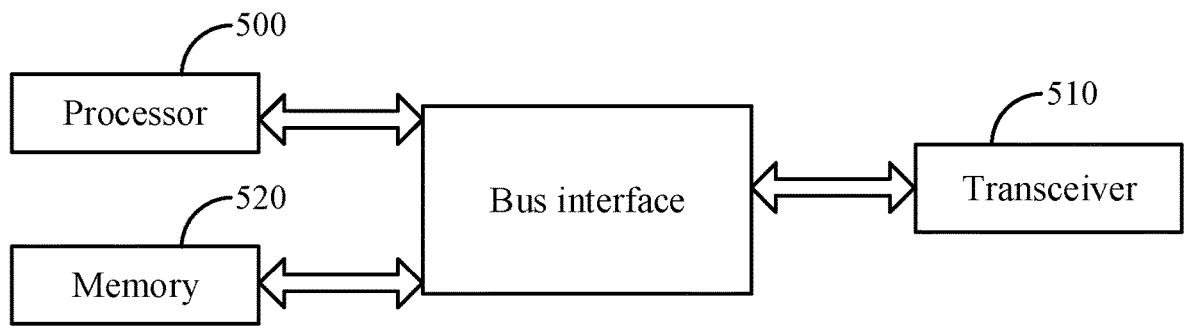
FIG. 7 illustrates a structural schematic diagram of a clock offset determination device at the receiving end according to embodiments of the present application.

Referring to FIG. 7, at the receiving end, a clock offset determination device provided in an embodiment of the present application includes:
a memory 520 configured to store program instructions;
a processor 500 configured to invoke the program instructions stored in the memory, and in accordance with the obtained program, perform the process of:

obtaining a phase measurement by measuring a C-PRS for carrier phase positioning sent by a sending end of a positioning reference signal;

determining a clock offset of a receiving end of the PRS and the sending end of the PRS based on the phase measurement.

Optionally, the processor 500 determines the clock offset based on multiple phase measurements obtained by measuring at multiple moments the C-PRS sent by the sending end.

Optionally, the processor 500 determines the clock offset based on the multiple phase measurements and multiple TOA measurements obtained by measuring the PRS sent by the sending end at multiple moments.

Optionally, the processor 500 is further configured to:

notify a UE of the clock offset, to allow the UE to eliminate an influence of the clock offset in a single-differential positioning calculation process;

or, notify the sending end, which sends the PRS and C-PRS, of the clock offset, to allow the sending end to compensate for a clock offset introduced due to a frequency deviation.

Optionally, the processor 500 obtains the phase measurement by measuring the C-PRS being phase-locked.

The transceiver 510 is configured to receive and send the data under the control of the processor 500.

Here, in FIG. 7, the bus architecture can include any numbers of interconnected buses and bridges, and specifically link various circuits of one or more processors represented by the processor 500 and the memory represented by the memory 520. The bus architecture may further link various other circuits such as peripheral device, voltage regulator and power management circuit, which are all well known in the art and thus will not be further described again herein. The bus interface provides an interface. The transceiver 510 may be a plurality of elements, i.e., include a transmitter and a receiver, and provide the units for communicating with various other devices over the transmission media. The processor 500 is responsible for managing the bus architecture and general processing, and the memory 520 may store the data used by the processor 500 when performing the operations.

The processor 500 may be Central Processing Unit (CPU), Application Specific Integrated Circuit (ASIC), Field-Programmable Gate Array (FPGA) or Complex Programmable Logic Device (CPLD).

Figure 8:
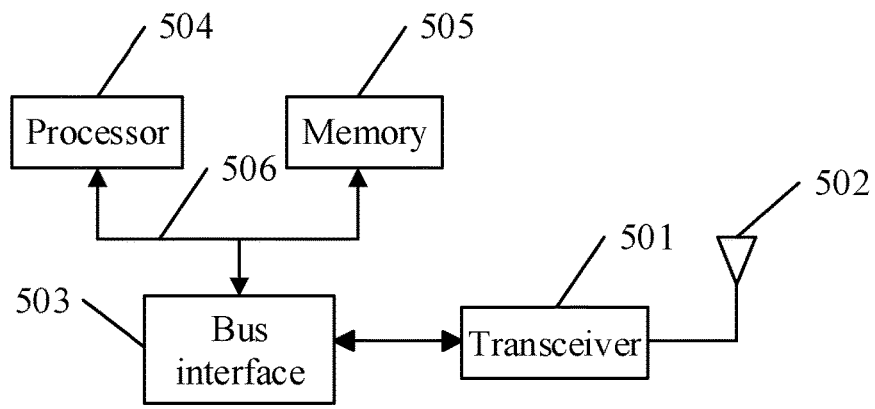
FIG. 8 illustrates a structural schematic diagram of a clock offset determination device at the sending end according to embodiments of the present application.

At the sending end, referring to FIG. 8, a clock offset determination device provided in an embodiment of the present application includes:

a memory 505 configured to store program instructions;

a processor 504 configured to invoke the program instructions stored in the memory, and in accordance with the obtained program, perform the process of:

determining a C-PRS for carrier phase positioning;

sending the C-PRS to a receiving end of a positioning reference signal, PRS, to allow the receiving end of the PRS to obtain a phase measurement by measuring the C-PRS and to determine a clock offset between the receiving end of the PRS and a sending end of the PRS based on the phase measurement.

Optionally, the processor 504 sends the C-PRS at multiple moments, to allow the receiving end to determine the clock offset based on multiple phase measurements obtained by measuring the C-PRS at multiple moments.

Optionally, the processor is further configured to:

send the PRS at multiple moments, to allow the receiving end of the PRS to determine the clock offset based on the multiple phase measurements and multiple Time Of Arrival, TOA, measurements obtained by measuring the PRS at multiple moments.

Optionally, the processor 504 is further configured to:

receive the clock offset sent by the receiving end, and correct a clock according to the clock offset.

Optionally, the processor 504 is further configured to:

send the PRS and the C-PRS to a UE at multiple moments after correcting the clock according to the clock offset.

Optionally, the processor 504 is further configured to:

obtain a phase measurement by measuring a C-PRS for carrier phase positioning sent by the sending end of the positioning reference signal;

determine a clock offset between the receiving end of the PRS and the sending end of the PRS based on the phase measurement.

That is to say, in the embodiments of the present application, any of the clock offset determination devices described above may be the sending end and the receiving end at the same time. For example, it may be a base station, which may be used as a clock offset determination device at the sending end or may be used as a clock offset determination device at the receiving end.

The transceiver 501 is configured to receive and send the data under the control of the processor 504.

In FIG. 8, the bus architecture is represented by the bus 506. The bus 506 can include any numbers of interconnected buses and bridges, and the bus 506 links various circuits including one or more processors represented by the processor 504 and the memory represented by the memory 505. The bus 500 can further link various other circuits such as peripheral device, voltage regulator and power management circuit, which are all well known in the art and thus will not be further described again herein. The bus interface 503 provides an interface between the bus 506 and the transceiver 501. The transceiver 501 can be one element or can be a plurality of elements, i.e., a plurality of receiver and transmitter, and provide the units for communicating with various other devices over the transmission media. The data processed by the processor 504 is transmitted over the wireless medium via the antenna 502, and further, the antenna 502 also receives the data and transfers the data to the processor 504.

The processor 504 is responsible for managing the bus 506 and the general processing, and can further provide various functions including timing, peripheral interface, voltage regulation, power management and other control functions. The memory 505 can be used to store the data used by the processor 504 when performing the operations.

Optionally, the processor 504 may be Central Processing Unit (CPU), Application Specific Integrated Circuit (ASIC), Field-Programmable Gate Array (FPGA) or Complex Programmable Logic Device (CPLD).

Figure 9:
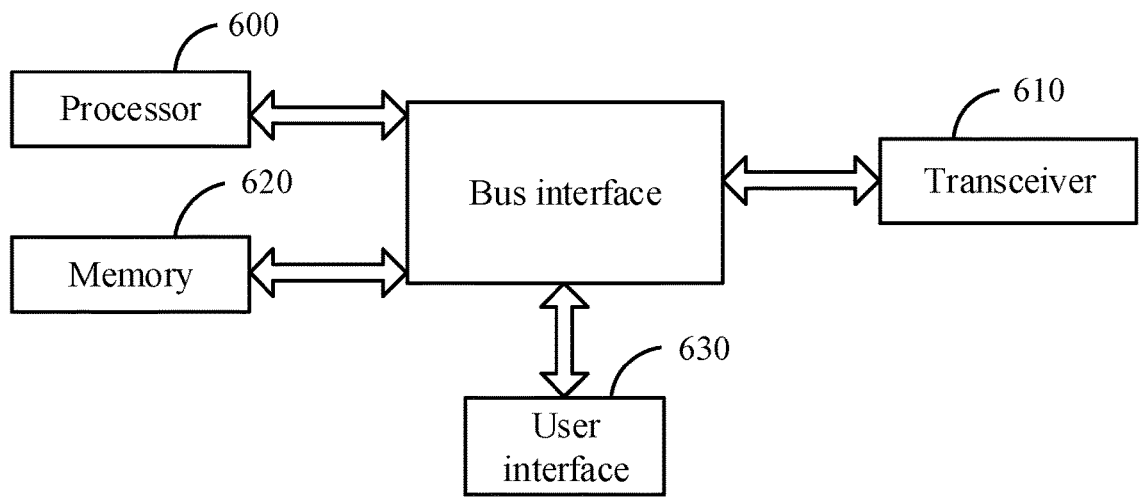
FIG. 9 illustrates a structural schematic diagram of a clock offset determination device at the sending end according to embodiments of the present application.

At the terminal side, referring to FIG. 9, a clock offset processing device provided in an embodiment of the present application includes:

a memory 620 configured to store program instructions;

a processor 600 configured to invoke the program instructions stored in the memory, and in accordance with the obtained program, perform the process of:

receiving a clock offset between a receiving end of a positioning reference signal and a sending end of the PRS, wherein the clock offset is determined based on a phase measurement, and the phase measurement is obtained by the receiving end of the PRS through measuring a Carrier phase Positioning Reference Signal (C-PRS) and the PRS, sent by the sending end at multiple moments;

eliminating the influence of the clock offset.

Optionally, the processor 600 eliminates the influence of the clock offset in a single-differential positioning calculation process.

The transceiver 610 is configured to receive and send the data under the control of the processor 600.

Here, in FIG. 9, the bus architecture may include any numbers of interconnected buses and bridges, and specifically link various circuits of one or more processors represented by the processor 600 and the memory represented by the memory 620. The bus architecture may further link various other circuits such as peripheral device, voltage regulator and power management circuit, which are all well known in the art and thus will not be further described again herein. The bus interface provides an interface. The transceiver 610 may be a plurality of elements, i.e., include a transmitter and a receiver, and provide the units for communicating with various other devices over the transmission media. For different user equipment, the user interface 630 may also be the interface capable of inter-connecting or exter-connecting with the required devices, and the connected devices include but not limited to keypad, display, loudspeaker, microphone, joystick and the like.

The processor 600 is responsible for managing the bus architecture and general processing, and the memory 620 may store the data used by the processor 600 when performing the operations.

Optionally, the processor 600 can be Central Processing Unit (CPU), Application Specific Integrated Circuit (ASIC), Field-Programmable Gate Array (FPGA) or Complex Programmable Logic Device (CPLD).

Figure 10:
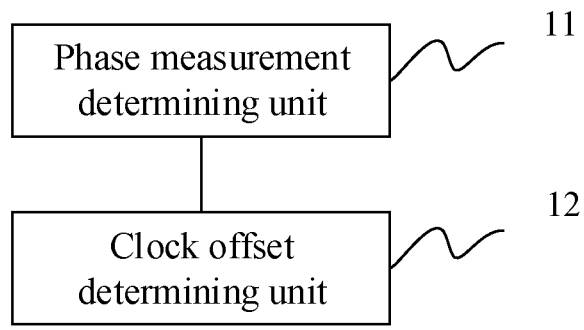
FIG. 10 illustrates a structural schematic diagram of another clock offset determination device at the receiving end according to embodiments of the present application.

At the receiving end, referring to FIG. 10, another clock offset determination device provided in an embodiment of the present application includes:

a phase measurement determining unit 11 configured to obtain a phase measurement by measuring a C-PRS for carrier phase positioning sent by a sending end of a positioning reference signal;

a clock offset determining unit 12 configured to determine a clock offset between a receiving end of the PRS and the sending end of the PRS based on the phase measurement.

Optionally, the clock offset determining unit 12 determines the clock offset based on multiple phase measurements obtained by measuring at multiple moments C-PRS sent by the sending end.

Optionally, the clock offset determining unit 12 determines the clock offset based on the multiple phase measurements and multiple TOA measurements obtained by measuring at multiple moments the PRSs sent by the sending end.

Optionally, the clock offset determining unit 12 is further configured to:

notify a UE of the clock offset, to allow the UE to eliminate the influence of the clock offset in a single-differential positioning calculation process;

or, notify the sending end, which sends the PRS, of the clock offset, to allow the sending end of the PRS to correct a clock according to the clock offset.

Optionally, the phase measurement determining unit 11 obtains the phase measurement by measuring the C-PRS being phase-locked.

Figure 11:
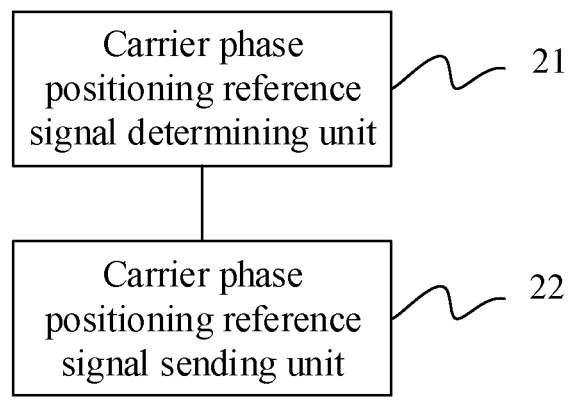
FIG. 11 illustrates a structural schematic diagram of another clock offset determination device at the sending end according to embodiments of the present application.

At the sending end, referring to FIG. 11, another clock offset determination device provided in an embodiment of the present application includes:

a carrier phase positioning reference signal determining unit 21 configured to determine a C-PRS for carrier phase positioning;

a carrier phase positioning reference signal sending unit 22 configured to send the C-PRS to a receiving end of a positioning reference signal, PRS, to allow the receiving end of the PRS to obtain a phase measurement by measuring the C-PRS and to determine a clock offset between the receiving end of the PRS and a sending end of the PRS based on the phase measurement.

Optionally, the carrier phase positioning reference signal sending unit 22 sends C-PRS at multiple moments, to allow the receiving end to determine the clock offset based on multiple phase measurements obtained by measuring the C-PRS at multiple moments.

Optionally, the carrier phase positioning reference signal sending unit 22 is further configured to:

send the PRS at multiple moments, to allow the receiving end to determine the clock offset based on the multiple phase measurements and multiple TOA measurements obtained by measuring the PRSs at multiple moments.

Optionally, the carrier phase positioning reference signal sending unit 22 is further configured to:

receive the clock offset sent by the receiving end, and correct a clock according to the clock offset.

Optionally, the carrier phase positioning reference signal sending unit 22 is further configured to:

send the PRS and C-PRS to a UE at multiple moments after correcting the clock according to the clock offset.

Figure 12:
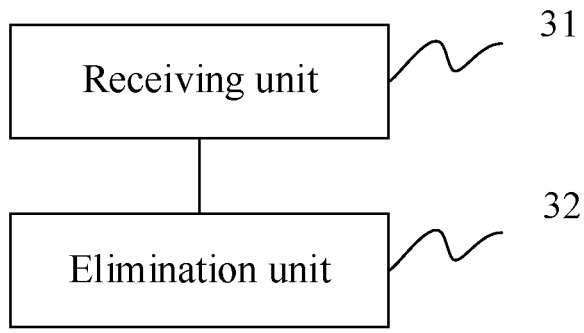
FIG. 12 illustrates a structural schematic diagram of another clock offset processing device at the UE end according to embodiments of the present application.

At the terminal side, referring to FIG. 12, another clock offset processing device provided in an embodiment of the present application includes:

a receiving unit 31 configured to receive a clock offset between a receiving end of a positioning reference signal and a sending end of the PRS, wherein the clock offset is determined based on a phase measurement, and the phase measurement is obtained by the receiving end through measuring the C-PRS and PRS sent by the sending end at multiple moments;

an elimination unit 32 configured to eliminate the influence of the clock offset.

Optionally, the elimination unit 32 eliminates the influence of the clock offset in a single-differential positioning calculation process.

It should be noted that the division of units in the embodiments of the present application is illustrative, and is merely a kind of logical function division, and there may be other division methods in actual implementations. In addition, the functional units in each embodiment of the present application may be integrated into one processing unit, or each unit may exist alone physically, or two or more units may be integrated into one unit. The above-mentioned integrated units can be implemented in the form of hardware, or can be implemented in the form of software functional units.

When the integrated unit is implemented in the form of software functional unit and sold or used as an independent product, it may be stored in a computer readable storage medium. Based on such understanding, the technical solution of the present application essentially or a part that contributes to the prior art or all or a part of the technical solution may be embodied in the form of software product. The computer software product is stored in a storage medium, and includes several instructions used to enable a computer device (which may be a personal computer, server, or network device, etc.) or a processor to perform all or some of the steps of the methods of various embodiments of the present application. The above-mentioned storage medium includes: USB flash drive, mobile hard disk, Read-Only Memory (ROM), Random Access Memory (RAM), magnetic disk or compact disc or various media that can store the program codes.

Figure 13:
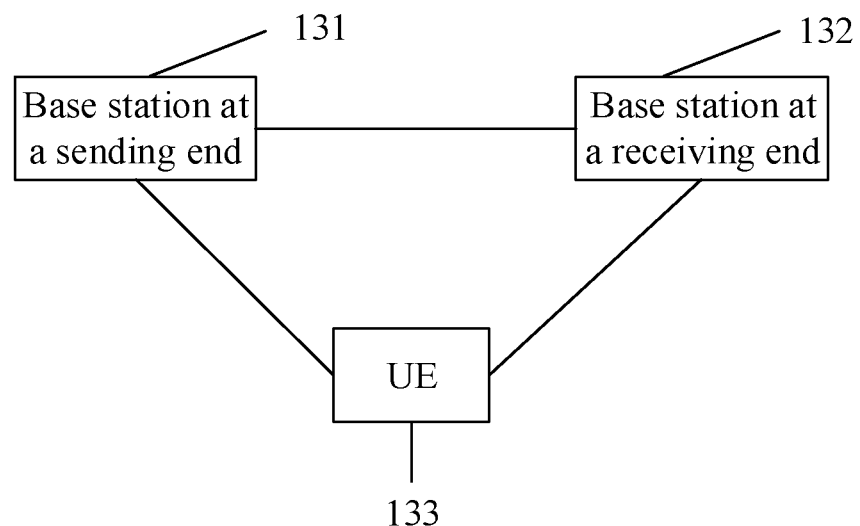
FIG. 13 illustrates a structural schematic diagram of a communication system according to an embodiment of the present application.

A communication system provided by an embodiment of the present application includes one or a combination of the above-mentioned devices. It may include any one or more of the clock offset determination devices and/or clock offset processing devices described above. For example, the clock offset determination device at the sending end and the clock offset determination device at the receiving end may both be base stations. Then, referring to FIG. 13, a communication system provided in an embodiment of the present application may include a sending-end base station 131, a receiving-end base station 132, and a UE 133.

It should be noted that the base stations and UE described in the embodiment of the present application may be used as a device at the sending end or as a device at the receiving end, and may have the functions of the sending end and the receiving end at the same time.

An embodiment of the present application provides a computing device, which can specifically be a desktop computer, a portable computer, a smart phone, a tablet computer, a Personal Digital Assistant (PDA) or the like. The computing device can include a Center Processing Unit (CPU), a memory, input/output devices and the like. The input device can include a keyboard, a mouse, a touch screen and the like, and the output device can include a display device such as Liquid Crystal Display (LCD), Cathode Ray Tube (CRT) or the like.

The memory can include a Read-Only Memory (ROM) and a Random Access Memory (RAM), and provide the program instructions and data stored in the memory to the processor. In an embodiment of the present application, the memory may be used to store the program of any one of the methods provided by the embodiments of the present application.

The processor invokes the program instructions stored in the memory and is configured to perform any one of the methods provided by the embodiments of the present application in accordance with the obtained program instructions.

An embodiment of the present application provides a computer storage medium for storing the computer program instructions used by the apparatuses provided by the embodiments of the present application described above, where the computer storage medium contains the program for performing any one of the methods provided by the embodiments of the present application described above.

The computer storage medium may be any available media or data storage device accessible to the computer, including but not limited to magnetic memory (e.g., floppy disk, hard disk, magnetic tape, Magnetic Optical disc (MO) or the like), optical memory (e.g., CD, DVD, BD, HVD or the like), semiconductor memory (e.g., ROM, EPROM, EEPROM, nonvolatile memory (NAND FLASH), Solid State Disk (SSD)) or the like.

The methods provided by the embodiments of the present application may be applied to the terminal devices, and may also be applied to the network devices.

Here, the terminal device can also be referred to as the User Equipment ("UE" for short), Mobile Station ("MS" for short), Mobile Terminal ("MT" for short) or the like. Optionally, the terminal can has the ability of communicating with one or more core networks via the Radio Access Network (RAN). For example, the terminal can be a mobile telephone (or called "cellular" telephone), or a computer with the mobile property. For example, the terminal can also be a portable, pocket, handheld, computer built-in or vehicle-carried mobile device.

The network device may be a base station (e.g., access point), which means the device in the access network communicating with the wireless terminal via one or more sectors over the air interface. The base station may be used to perform the inter-conversion between the received air frame and the IP packet, and used as the router between the wireless terminal and the rest of the access network, wherein the rest of the access network may include Internet Protocol (IP) networks. The base station may further coordinate the attribute management of the air interface. For example, the base station can be the BTS in the GSM or CDMA, or can be the NodeB in the WCDMA, or can be the NodeB or eNB or e-NodeB (evolutional Node B) in the LTE, or can be the gNB in the 5G system, or the like, which is not limited in the embodiments of the present application.

The processing flows of the above methods may be implemented by a software program, which may be stored in a storage medium. When the stored software program is invoked, the above method steps are performed.

In summary, by adding the C-PRS reference signals for signal phase locking and frequency synchronization, the embodiments of the present application propose a method of achieving the time and frequency synchronization between base stations through a base station to monitor the reference signals (PRS and C-PRS) of a neighboring base station, solving the problem that the precision of the positioning algorithm of the existing single-differential scheme is limited by the frequency deviation of the sending end, and improving the positioning performance of the system. At the same time, it solves the problem of limited precision of time offset measurement estimation based on the PRS signal and the problem that the time offset caused by the frequency offset reduces the positioning performance of the system.

It should be understood by those skilled in the art that the embodiments of the invention can provide methods, systems and computer program products. Thus the invention can take the form of hardware embodiments alone, software embodiments alone, or embodiments combining the software and hardware aspects. Also the invention can take the form of computer program products implemented on one or more computer usable storage mediums (including but not limited to magnetic disk memories, CD-ROMs, optical memories and the like) containing computer usable program codes therein.

The invention is described by reference to the flow charts and/or the block diagrams of the methods, the devices (systems) and the computer program products according to the embodiments of the invention. It should be understood that each process and/or block in the flow charts and/or the block diagrams, and a combination of processes and/or blocks in the flow charts and/or the block diagrams can be implemented by the computer program instructions. These computer program instructions can be provided to a general-purpose computer, a dedicated computer, an embedded processor, or a processor of another programmable data processing device to produce a machine, so that an apparatus for implementing the functions specified in one or more processes of the flow charts and/or one or more blocks of the block diagrams is produced by the instructions executed by the computer or the processor of another programmable data processing device.

These computer program instructions can also be stored in a computer readable memory which is capable of guiding the computer or another programmable data processing device to operate in a particular way, so that the instructions stored in the computer readable memory produce a manufacture including the instruction apparatus which implements the functions specified in one or more processes of the flow charts and/or one or more blocks of the block diagrams.

These computer program instructions can also be loaded onto the computer or another programmable data processing device, so that a series of operation steps are performed on the computer or another programmable device to produce the computer-implemented processing. Thus the instructions executed on the computer or another programmable device provide steps for implementing the functions specified in one or more processes of the flow charts and/or one or more blocks of the block diagrams.

Although the preferred embodiments of the invention have been described, those skilled in the art can make additional alterations and modifications to these embodiments once they learn about the basic creative concepts. Thus the attached claims are intended to be interpreted to include the preferred embodiments as well as all the alterations and modifications falling within the scope of the invention.

Evidently those skilled in the art can make various modifications and variations to the embodiments of the invention without departing from the spirit and scope of the embodiments of the invention. Thus the invention is also intended to encompass these modifications and variations therein as long as these modifications and variations to the embodiments of the invention come into the scope of the claims of the invention and their equivalents.

The invention claimed is:

1. A clock offset determination method, comprising:
    obtaining a phase measurement by measuring a Carrier phase Positioning Reference Signal, C-PRS, for carrier phase positioning sent by a sending end of a positioning reference signal, PRS;
    determining a clock offset between a receiving end of the PRS and the sending end of the PRS based on the phase measurement;
    notifying a User Equipment, UE, of the clock offset, to allow the UE to eliminate an influence of the clock offset in a single-differential positioning calculation process; or
    notifying the sending end of the PRS, of the clock offset, to allow the sending end of the PRS to correct a clock according to the clock offset;
    wherein the determining a clock offset between a receiving end of the PRS and the sending end of the PRS based on the phase measurement comprises:
    determining the clock offset based on multiple phase measurements obtained by measuring, at multiple moments, C-PRSs sent by the sending end of the PRS, and multiple Time Of Arrival, TOA, measurements obtained by measuring the PRS sent by the sending end of the PRS at multiple moments.

2. The method according to claim 1, comprising:
    obtaining the phase measurement by measuring the C-PRS being phase-locked.

3. A clock offset determination method, comprising:
    determining a Carrier phase Positioning Reference Signal, C-PRS, for carrier phase positioning;
    sending the C-PRS to a receiving end of a positioning reference signal, PRS at multiple moments and sending the PRS at multiple moments, to allow the receiving end of the PRS to obtain multiple a-phase measurements by measuring the C-PRS at multiple moments and multiple Time Of Arrival, TOA, measurements by measuring the PRS at multiple moments, and to determine a clock offset between the receiving end of the PRS and a sending end of the PRS based on the multiple phase measurements
    and the multiple TOA measurements;
    receiving the clock offset sent by the receiving end of the PRS, and correcting a clock according to the clock offset.

4. The method according to claim 3, comprising:
    sending the PRS and the C-PRS to a User Equipment, UE, at multiple moments after correcting the clock according to the clock offset.

5. A clock offset determination device, comprising:
    a memory configured to store program instructions;
    a processor configured to invoke the program instructions stored in the memory, and in accordance with the obtained program, perform the process of the method according to claim 3.

6. The device according to claim 5, wherein the processor is configured to:
    send the PRS and the C-PRS to a User Equipment, UE, at multiple moments after correcting the clock according to the clock offset.

7. A clock offset determination device, comprising:
    a memory configured to store program instructions;
    a processor configured to invoke the program instructions stored in the memory, and in accordance with the obtained program, perform the process of:
    obtaining a phase measurement by measuring a Carrier phase Positioning Reference Signal, C-PRS, for carrier phase positioning sent by a sending end of a positioning reference signal, PRS;
    determining a clock offset between a receiving end of the PRS and the sending end of the PRS based on the phase measurement;
    notifying a User Equipment, UE, of the clock offset, to allow the UE to eliminate an influence of the clock offset in a single-differential positioning calculation process: or
    notifying the sending end of the PRS, of the clock offset, to allow the sending end of the PRS to correct a clock according to the clock offset;
    wherein the determining a clock offset between a receiving end of the PRS and the sending end of the PRS based on the phase measurement comprises:
    determining the clock offset based on multiple phase measurements obtained by measuring, at multiple moments, C-PRSs sent by the sending end of the PRS, and multiple Time Of Arrival, TOA, measurements obtained by measuring the PRS sent by the sending end of the PRS at multiple moments.

8. The device according to claim 7, wherein the processor is configured to perform:
    obtaining the phase measurement by measuring the C-PRS being phase-locked.

* * * * *